United States Patent
Bilton et al.

(10) Patent No.: US 8,528,335 B2
(45) Date of Patent: Sep. 10, 2013

(54) FUEL HEATER SYSTEM INCLUDING HOT AND WARM WATER SOURCES

(75) Inventors: Timothy Russell Bilton, Simpsonville, SC (US); Dean Matthew Erickson, Simpsonville, SC (US); Brian Michael Gallagher, Simpsonville, SC (US); Ravi Praveen Eluripati, Simpsonville, SC (US); Rakesh Sivasankaran, Karnataka (IN)

(73) Assignee: General Electric Company, Schenectady, NY (US)

( * ) Notice: Subject to any disclaimer, the term of this patent is extended or adjusted under 35 U.S.C. 154(b) by 739 days.

(21) Appl. No.: 12/698,336

(22) Filed: Feb. 2, 2010

(65) Prior Publication Data

US 2011/0185702 A1    Aug. 4, 2011

(51) Int. Cl.
 *F02C 7/224*    (2006.01)
(52) U.S. Cl.
 USPC ............................................. 60/736; 60/39.5
(58) Field of Classification Search
 USPC ................ 60/736, 39.5–39.512, 39.281, 730, 60/734, 39.3
 See application file for complete search history.

(56) References Cited

U.S. PATENT DOCUMENTS

| | | | |
|---|---|---|---|
| 4,651,530 A | 3/1987 | Omori | |
| 5,794,446 A | 8/1998 | Earley et al. | |
| 6,128,895 A * | 10/2000 | Takahama et al. | 60/39.182 |
| 6,389,797 B1 | 5/2002 | Sugishita et al. | |
| 6,499,302 B1 | 12/2002 | Ranasinghe | |
| 6,920,760 B2 * | 7/2005 | Schottler et al. | 60/772 |
| 7,596,939 B2 * | 10/2009 | Kataoka et al. | 60/39.281 |
| 7,603,840 B2 * | 10/2009 | Hino et al. | 60/39.465 |
| 2003/0000218 A1 | 1/2003 | Ranasinghe | |
| 2006/0117757 A1 | 6/2006 | Tanaka et al. | |
| 2009/0320489 A1 * | 12/2009 | Estrada et al. | 60/772 |

* cited by examiner

*Primary Examiner* — Andrew Nguyen
(74) *Attorney, Agent, or Firm* — Cantor Colburn LLP

(57) ABSTRACT

A system is provided and includes first and second water supplies at first and second relatively high and low temperatures, respectively, a heat exchanger, coupled to the water supplies, through which fuel and relative amounts of the water supplies at the first and second temperatures flow for fuel heating and a controller, operably interposed between the water supplies and the heat exchanger, to select and/or modulate the relative amounts of the water supplies permitted to flow through the heat exchanger to heat the fuel to a temperature based on a heating requirement to meet a modified wobbe index (MWI) rating.

21 Claims, 4 Drawing Sheets

FUEL HEATER SYSTEM INCLUDING HOT AND WARM WATER SOURCES

BACKGROUND OF THE INVENTION

The subject matter disclosed herein relates to fuel heating system using hot and warm water sources.

In general, gas turbine engines include a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, the compressor rotor blades rotate about the shaft, and, acting in concert with the stator blades, compress a flow of air. The supply of compressed air then is used in the combustor to combust a supply of fuel. The resulting flow of hot gases from the combustion is expanded through the turbine and causes the turbine blades to rotate such that the system as a whole acts to convert fuel into mechanical energy.

Often, the supply of fuel used in a combustor is preheated to promote efficient engine operation. As such, it is occasionally necessary to vary the preheated temperature of the fuel based on changing fuel characteristics. However, a conventional fuel delivery system may have limitations that result in difficulties or delays in controlling the preheated temperature of fuel as it is delivered to the combustor. This may lead to the fuel being delivered at inappropriate preheated temperatures.

Combustion turbine engines are generally designed to operate using fuels having certain characteristics relating to heating value. The heating value of a fuel, which also may be referred to as the gross calorific heating value of the fuel, gross energy or wobbe index rating, generally describes the amount of heat or energy released when the fuel is combusted. In combustion turbine engine applications, though, the amount of energy released by a fuel being combusted through a fuel nozzle at a given pressure ratio may be more accurately described if the temperature at which the fuel is delivered to the nozzle is taken into account. The fuel characteristic that takes into account or compensates for the temperature of the fuel is generally referred to as the modified wobbe index (MWI) rating, which is equal to the Lower Heating Value (LHV) of the fuel divided by the square root of the absolute temperature of the fuel times the specific gravity of the fuel. The MWI rating thus refers to a fuel measure describing the amount of energy released by a fuel being combusted through a fuel nozzle at a given pressure ratio that takes into account or compensates for the temperature at which the fuel is delivered to the nozzle.

Combustion turbine engines are generally designed to operate with fuels that have a specific MWI rating or fall within a range of acceptable MWI ratings. This being the case, having the capability to modify or control the temperature of the fuel being delivered to the combustor (thereby modifying or controlling the MWI rating of the fuel) is a useful way to insure the engine is using acceptable fuel that promotes efficient operation and reduces the risk of combustor damage.

However, given limitations of conventional systems, different fuels of differing compositions and heating values may be successively delivered to the combustor with conditions lying outside of the acceptable or targeted MWI rating. This may subsequently result in damage to the combustor, inefficient engine performance and/or downgraded engine operation.

BRIEF DESCRIPTION OF THE INVENTION

According to one aspect of the invention, a system is provided and includes first and second water supplies at first and second relatively high and low temperatures, respectively, a heat exchanger, coupled to the water supplies, through which fuel and relative amounts of the water supplies at the first and second temperatures flow for fuel heating and a controller, operably interposed between the water supplies and the heat exchanger, to select and/or modulate the relative amounts of the water supplies permitted to flow through the heat exchanger to heat the fuel to a temperature based on a heating requirement to meet a modified wobbe index (MWI) rating.

According to another aspect of the invention, a system is provided and includes first and second water supplies, respectively disposed downstream and upstream from a component of an HRSG, at first and second relatively high and low temperatures, respectively, a heat exchanger, coupled to a supply of fuel and the water supplies, through which the fuel flows toward a combustor of a gas turbine engine and relative amounts of the water supplies flow for fuel heating and a controller, operably interposed between the water supplies and the heat exchanger, to select and/or modulate the relative amounts of the water supplies permitted to flow through the heat exchanger to heat the fuel to a temperature based on a heating requirement to meet a modified wobbe index (MWI) rating.

According to yet another aspect of the invention, a system is provided and includes a testing device to determine a heating value of a fuel to be combusted, a heat exchanger to heat the fuel to a target fuel temperature based on the heating value, a first supply of relatively hot water provided from a component, a second supply of relatively warm water bypassing the component, a measuring device to determine an actual fuel temperature of the fuel and a controller, coupled to the testing and measuring devices and operably interposed between the first and second water supplies and the heat exchanger, to select and/or modulate amounts of the relatively hot and warm water deliverable toward the heat exchanger in accordance with the target and actual fuel temperatures.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features without limitation, by way of example with reference to the drawings.

DETAILED DESCRIPTION OF THE INVENTION

Figure 1:
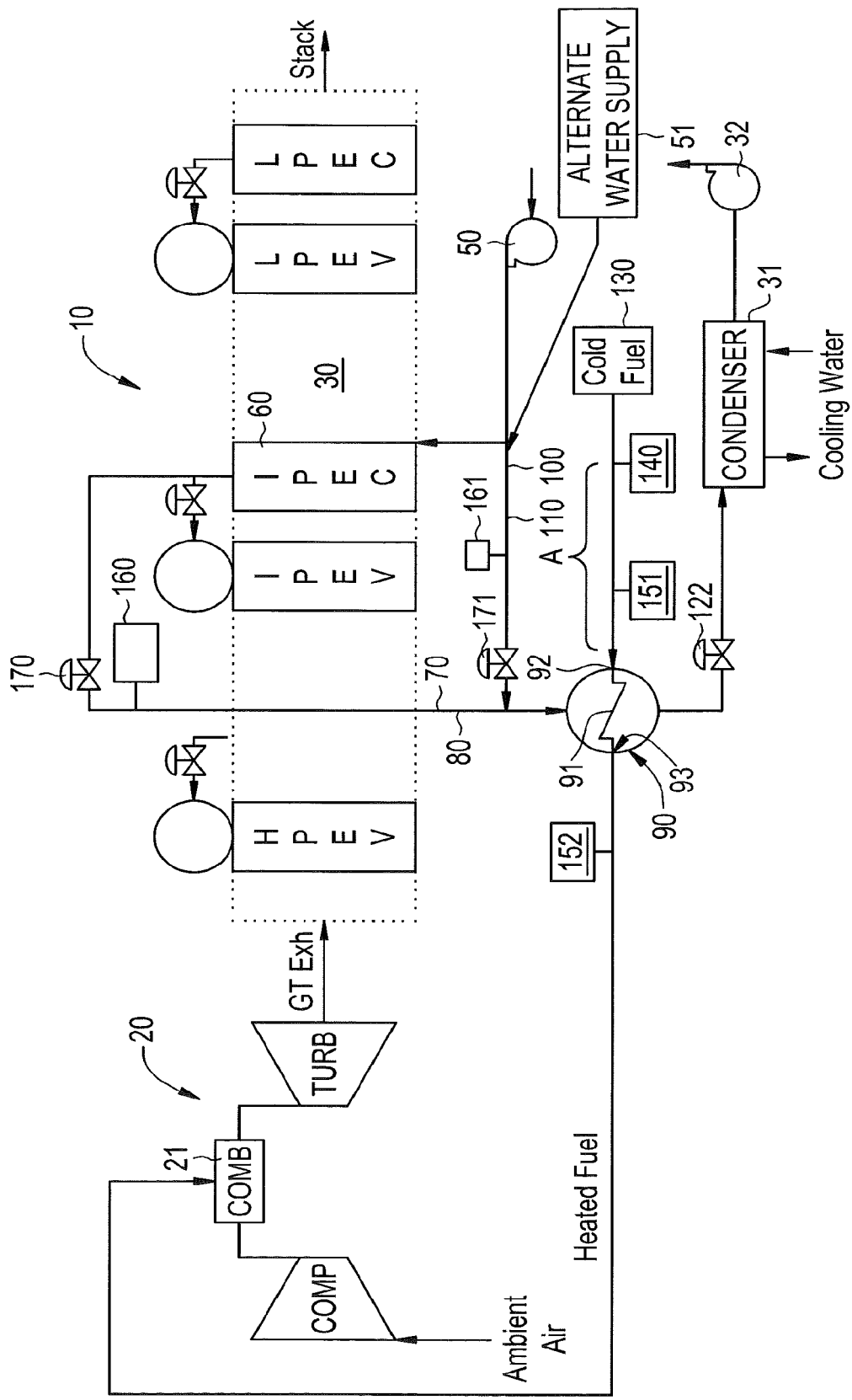
FIG. 1 is a schematic view of a combined cycle power plant in accordance with embodiments.
Figure 2:
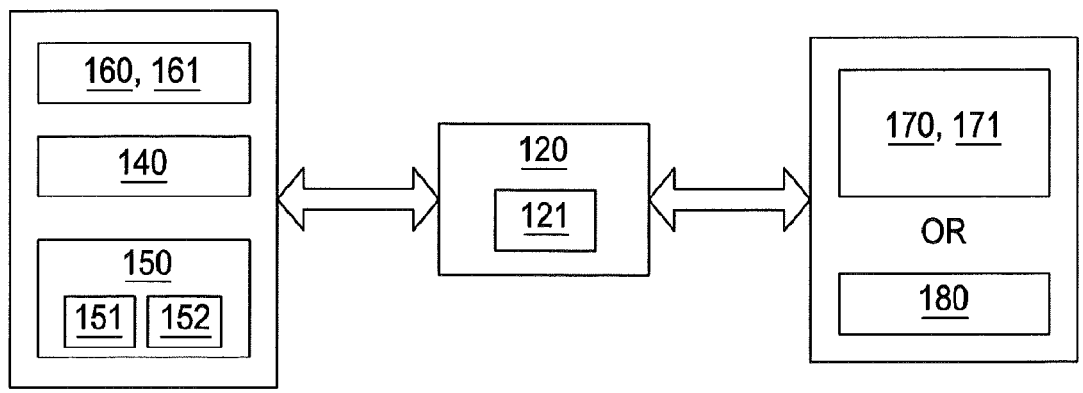
FIG. 2 is a schematic view of a controller of the combined cycle power plant of FIG. 1.
Figure 3:
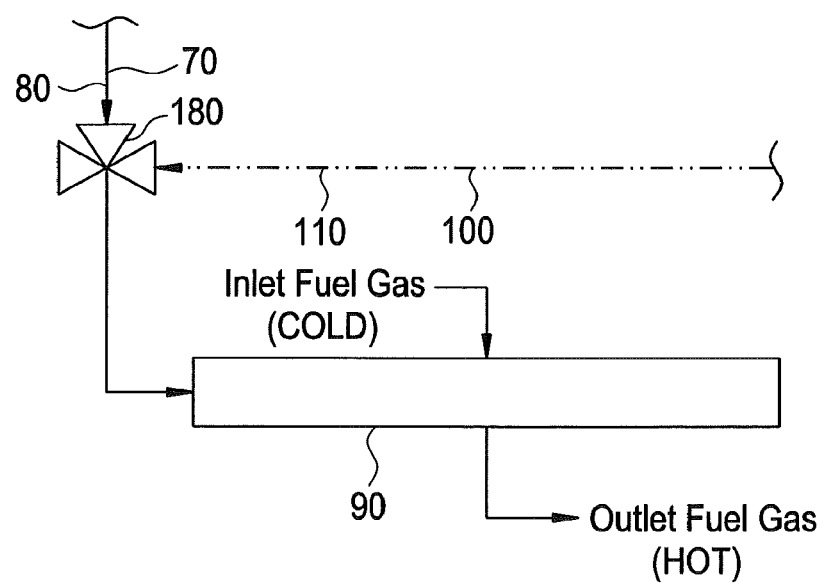
FIG. 3 is a schematic view of a combined cycle power plant in accordance with other embodiments.

With reference to FIGS. 1-3, in a combined cycle power plant 10, fuel and air are combusted in a gas turbine engine 20 to generate mechanical energy, heat energy and electricity. A portion of the heat energy is transmitted to a Heat Recovery Steam Generator (HRSG) 30 where the heat energy is employed to generate steam from, for example, water condensed in a condenser 31 and pumped by a condensate pump 32. A portion of the steam is then used to generate additional mechanical energy and/or electricity.

In accordance with exemplary embodiments, water recycled from the HRSG 30 may be directed to a feed water pump 50, which pumps a portion of the recycled water to, for example, an IP economizer 60 of the HRSG 30. This water is heated and output at a temperature of approximately 440° F. as a first water supply 70. This first water supply 70 of relatively hot water is then supplied via first piping 80 toward a heat exchanger 90 where it can be employed to heat fuel flowing to a combustor 21 of the gas turbine engine 20. While described herein as having a temperature of approximately 400-440° F., it is understood that the first water supply 70 may have various temperatures and pressures and may be extracted from or exhausted by components other than the IP economizer 60.

Another portion of the water pumped from the feed water pump 50 may be directed to bypass the HRSG 30 and the IP economizer 60 as a second water supply 100 of relatively warm water having a temperature approximately 300° F. by way of second piping 110. The second piping 110 supplies the second water supply 100 toward the heat exchanger 90 where it can also be employed to heat the fuel. In this way, by selecting and/or modulating relative amounts of the first and second water supplies 70, 100 or by providing water from the first or second water supply it is possible to modify the temperature to which the fuel can be heated through the heat exchanger 90. While described herein as having a temperature of approximately 300° F., it is understood that the second water supply 100 may have various temperatures and pressures and may be extracted from or exhausted by components other than the IP feed water pump 50.

As shown in FIG. 1, the second water supply 100 may be fed to the second piping from an alternative water supply 51. The alternative water supply 51 may include the feed water pump 50, another component of the HRSG 30, an auxiliary boiler, some other similar source and/or a combination thereof That is, although the first water supply 70 is described above as being output from the IP economizer 60 and the second water supply 100 is described as bypassing the IP economizer 60, it is understood that this arrangement is merely exemplary and that the first and second water supplies 70 and 100 can be respectively output from and made to bypass other components. These other components may include a high pressure (HP) economizer coupled to the HP evaporator shown in FIG. 1, an auxiliary boiler, another alternate water supply or some combination of these and/or additional water supplies as long as the first and second water supplies 70 and 100 are provided at differing relatively hot and warm temperatures.

As shown in FIG. 2, a controller 120 determines the fuel heating requirements of the fuel to be heated. Based on that determination, the controller 120 selects and/or modulates relative amounts of water that may be provided from the first and/or second water supplies 70 and/or 100 for the fuel heating in the heat exchanger 90. In embodiments of the invention, the controller 120 may include a turbine control system and/or other suitable components.

The fuel heating requirements of a fuel are related to the calorific heating value of the fuel and specific gravity, which are based on a composition of the fuel. Concurrently, fuel nozzles of the combustor 21 are sized for a specific MWI. Thus, with the fuel properties known, the fuel temperature can be modulated accordingly and within a defined MWI range.

Therefore, for fuels with lower heating values, a reduced level of fuel heating is required for operation of the gas turbine engine 20. This is particularly true when the gas turbine engine 20 operates at a relatively low gas turbine load and thus requires a relatively reduced quantity of fuel. Previously, this situation required that high temperature water from the lone available water supply be permitted to flow to the fuel gas heat exchanger in only low quantities with low flow rates. The low flow rates tended to result in a laminar flow of the water through the heat exchanger with correspondingly low efficiency fuel heating. In addition, a temperature control valve (TCV), located at the heat exchanger exit and configured to modulate the flow rate of the water through the heat exchanger, would normally experience reduced service life due to frequent cycling.

In contrast, in the present system, the relatively hot and warm water supplies 70, 100 are provided in modulated amounts to heat fuels with relatively high or low heating values at high, normal or low gas turbine loads (with corresponding fuel flows). Thus, since the relatively warm water of the second water supply 100 can be employed for fuel heating, a reduced water flow may not be required for fuels with relatively low heat values and/or during periods of low turbine loads. As such, a turbulent flow condition can be maintained through the heat exchanger 90 with relatively efficient heat transfer capability and a service lifetime of a relevant TCV 122 correspondingly maintained.

The heat exchanger 90 may include a tube and shell type heat exchanger having a fuel line 91. Unheated fuel flows through the fuel line 91 from an inlet 92 to an outlet 93 where the heated fuel is then directed toward the combustor 21. The heat exchanger 90 may be coupled to one or more fuel sources 130 whereby the heat exchanger 90 may be sequentially or jointly receptive of multiple fuels of varying compositions, varying calorific heating values and varying specific gravities. The heat exchanger 90 may be receptive of those multiple fuels by way of a single fuel line as shown in FIG. 1 or, in some cases, multiple fuel lines. In some cases, the heat exchanger 90 may be located downstream by a predefined distance A of a testing device 140 to be discussed below, which measures the calorific heating value or analyzes the fuel gas composition.

With reference to FIGS. 1 and 2, with the possibility that multiple types of fuels may flow through the heat exchanger 90 and the possibility that changes in the fuel type may occur relatively frequently and/or rapidly, the fuel testing device 140, coupled to and in signal communication with the controller 120, may be disposed at or upstream of the heat exchanger 90 (see FIG. 1). Such a fuel testing device 140 serves to determine a calorific heating value and specific gravity of the fuel currently being or soon to be combusted or a composition of the fuel currently being or soon to be combusted such that a further determination can be made as to its calorific heating value, specific gravity and/or a corresponding required fuel temperature.

The fuel testing device 140 may include at least one or both of a gas chromatograph and/or a gas calorimeter (i.e., a wobbe meter). A gas chromatograph determines the chemical constituents of a fuel substance and has a relatively long sample time. A gas calorimeter or a wobbe meter provides a more immediate measurement of the calorific heating value and specific gravity of the fuel and detects a change in a fuel's heating value and/or its composition substantially in real-time. The fuel testing device 140 may be provided at various locations proximate to the heat exchanger 90 but, in some embodiments, will be provided upstream from the heat exchanger 90 and/or proximate to the fuel inlet 92.

In some exemplary embodiments, the fuel testing device 140 may be positioned such that the length A of conduit between the fuel testing device 140 and the heat exchanger 90 is between approximately 300 and 900 feet or, in some cases, between approximately 200 and 300 feet or, in still other cases, between approximately 100 and 200 feet. As such, the fuel testing device 140 can be employed to provide whatever additional time is necessary or desirable to allow for system response prior to fuel combustion once the calorific heating value and specific gravity of the fuel and/or the corresponding required fuel temperature is ascertained.

At least one of the fuel testing device 140, the controller 120 and/or some other component may include a memory 121, such as volatile memory, non-volatile memory or a combination thereof, on which a database associating various fuel compositions with various calorific heating values and specific gravity are stored. In this way, once the fuel composition is determined, the calorific value of the fuel associated with the determined fuel composition may be ascertained, calculated or measured directly by, for example, components of the turbine control system of the controller 120.

As shown in FIGS. 1 and 2, the controller 120 may be further coupled to and in signal communication with a fuel temperature measuring device 150, which serves to measure a temperature of the fuel and to provide information reflective of the fuel temperature to the controller 120. In detail, the fuel temperature measuring device 150 may include first and second fuel temperature measuring devices 151, 152 disposed at the inlet 92 and the outlet 93, respectively (see FIG. 1). The measuring devices 151 and 152 measure the unheated and heated fuel temperatures, respectively, and provide information to the controller 120 that may be utilized for further fuel heating control.

With at least the above described information provided to the controller 120, the controller 120 may compare the temperature of the heated fuel (i.e., an actual fuel temperature) with a target fuel temperature, which may be based on the calorific heating value of the fuel calculated by, for example, the turbine control system of the controller 120 or a heating value of the fuel. The controller 120 can then determine based on any difference between those temperatures whether the difference is within a predefined range or, if not, whether it is necessary to modulate the relative amounts of the relatively hot and warm water permitted to flow through the heat exchanger 90 for modified fuel heating or, in some cases, a cooling of excessively heated fuel.

The inlet fuel temperature may be further employed to determine how efficient the system 10 is in heating the fuel. From this heating efficiency information, the controller 120 can make increasingly accurate judgments regarding the selection of a specific water supply or a determination that a combination of the first and second water supplies 70 and 100 is required to heat the fuel to within a range related to the MWI.

In further embodiments, the controller 120 may also be coupled to and in signal communication with first and second water temperature measuring devices 160, 161 disposed at the first and second water supplies 70, 100 (see FIG. 1) to measure the first and second temperatures and to provide the controller 120 with information reflective of the water temperatures. In this way, the controller 120 can be provided with still further information by which an accurate judgment can be made as to the relative amount of hot and warm water that should be permitted to flow to the heat exchanger 90 from the first and second water supplies 70, 100.

Referring to FIGS. 1-3, the system 10 may include the first and second piping 80, 110 by which the first and second supplies of the water 70, 100 are directed toward and fluidly coupled to the heat exchanger 90, respectively. As shown in FIGS. 1 and 2, the system 10 includes first and second flow control valves 170, 171, which are coupled to and in signal communication with the controller 120. The first and second flow control valves 170, 171 may be disposed upstream from the heat exchanger 90 and along respective lengths of the first and second piping 80, 110. Conversely, as shown in FIGS. 2 and 3, a three-way flow control valve 180, coupled to and in signal communication with the controller 120, may be disposed upstream from the heat exchanger 90 and at respective terminals of the first and second piping 80, 110. In either case, once the controller 120 makes a determination as to the heating value of the fuel being or soon to be combusted, the controller 120 further determines if the first and/or the second water supplies 70 and/or 100 shall be used for heating and permitted to flow to the heat exchanger 90. The controller 120 then issues a signal to the first and second flow control valves 170, 171 and/or the three-way valve 180 that instructs the valves to open or close accordingly.

While FIGS. 1 and 3 illustrate the first and second flow control valves 170, 171 and the three-way valve 180 as being components of separate embodiments of the invention, it is understood that multiple embodiments are possible. As such, some embodiments may include both the first and second flow control valves 170, 171 along with the three-way valve 180 working cooperatively and with the first and second flow control vales 170, 171 providing, for example, options for isolation in response to signals issued from the controller 120.

Figure 4:
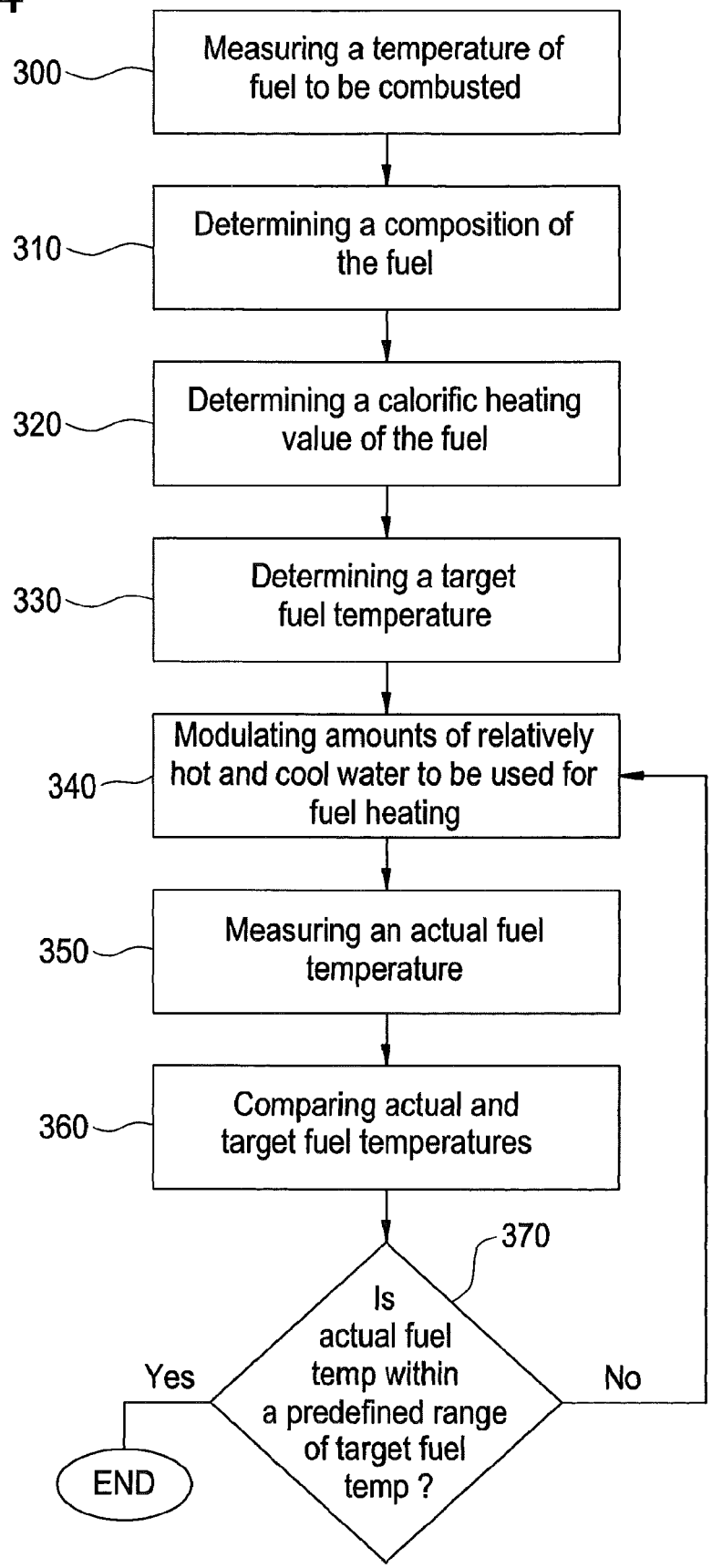
FIG. 4 is a flow diagram illustrating a method of operating a combined cycle power plant.

With reference now to FIG. 4, a method of operating a system for use with a combined cycle power plant, including a gas turbine engine having a combustor and an HRSG is provided. The method includes measuring a temperature of fuel to be combusted or soon to be combusted 300 and determining a composition of the fuel 310 to thereby ascertain a calorific heating value of the fuel 320. Here, it is noted that the determining of the fuel composition 310 may be replaced by a direct determination of a fuel heating value or otherwise achieved concurrently with the determining of the calorific heating value of the fuel 320.

Once the calorific heating value of the fuel is ascertained, a target fuel temperature can be set 330 and fuel heating begun. At this time, a water supply or a combination of water supplies are permitted to be used for the fuel heating are modulated 340, the actual fuel temperature is measured 350 and the actual and target fuel temperatures are compared 360. If, as a result of this comparison, the actual fuel temperature is found to not be within a predefined range of the target temperature, control returns to the modulating operation 340 such that either the first or the second water supply is utilized in the fuel heating pending the need to increase or decrease the fuel temperature.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
a heat recovery steam generator (HRSG);
first and second water supplies at first and second relatively high and low temperatures, respectively, the first and second water supplies originating from a common source prior to assuming the first and second relatively high and low temperatures;
a heat exchanger, coupled to the water supplies, through which fuel and relative amounts of the water supplies at the first and second temperatures flow for fuel heating,
the first water supply being output to the heat exchanger from a component of the HRSG disposed downstream from the common source, and
the second water supply being bypassed to the heat exchanger from the common source around the component of the HRSG and fed by an auxiliary water supply at a point between the common source and the heat exchanger; and
a controller, operably interposed between the water supplies and the heat exchanger, to select and/or modulate the relative amounts of the water supplies permitted to flow through the heat exchanger to heat the fuel to a temperature based on a heating requirement to meet a modified wobbe index (MWI) rating.

2. The system according to claim 1, wherein the first water supply at the first temperature is output from the component of the HRSG and the second water supply at the second temperature is output from another component of the HRSG or an alternate water supply.

3. The system according to claim 1, wherein the heat exchanger is receptive of multiple fuels of varying compositions.

4. The system according to claim 1, further comprising a fuel testing device coupled to the controller and disposed at or upstream of the heat exchanger to determine a composition of the fuel and/or a heating value of the fuel.

5. The system according to claim 4, wherein the fuel-testing device comprises at least one of a gas chromatograph and/or a gas calorimeter.

6. The system according to claim 4, wherein the fuel testing device is disposed at a predefined distance upstream from the heat exchanger.

7. The system according to claim 4, wherein the controller comprises memory on which fuel information is stored.

8. The system according to claim 4, wherein the controller calculates the heating requirement based on a measured calorific heating value of the fuel or by calculation or approximation thereof given the determined fuel composition.

9. The system according to claim 1, further comprising a fuel temperature measuring device coupled to the controller and disposed at the heat exchanger to determine the temperature of the fuel.

10. The system according to claim 1, further comprising first and second water temperature measuring devices coupled to the controller and disposed at the first and second water supplies to measure the first and second water temperatures.

11. The system according to claim 1, further including first and second piping by which the first and second water supplies are coupled to the heat exchanger, respectively.

12. The system according to claim 11, wherein the controller comprises first and second isolation and flow control valves disposed upstream from the heat exchanger and along the first and second piping, respectively.

13. The system according to claim 11, wherein the controller comprises a three-way flow control valve disposed upstream from the heat exchanger and at terminals of the first and second piping.

14. The system according to claim 1, wherein the first water supply at the first temperature is output from the component of the HRSG and the second water supply at the second temperature is output from the auxiliary water supply comprising another component of the HRSG or an alternate water supply.

15. A system, comprising:
a testing device to determine a heating value of a fuel to be combusted;
a heat exchanger to heat the fuel to a target fuel temperature based on the heating value;
a first supply of relatively hot water originating from a common source and being provided to the heat exchanger from a component of a heat recovery steam generator (HRSG) disposed downstream from the common source;
a second supply of relatively warm water originating from the common source and bypassing the component,
the second supply of relatively warm water being fed by an auxiliary water supply at a point between the common source and the heat exchanger,
the first and second supplies of relatively hot and warm water originating from the common source prior to becoming relatively hot and warm, respectively;
a measuring device to determine an actual fuel temperature of the fuel; and
a controller, coupled to the testing and measuring devices and operably interposed between the first and second water supplies and the heat exchanger, to select and/or modulate amounts of the relatively hot and warm water deliverable toward the heat exchanger in accordance with the target and actual fuel temperatures.

16. A system, comprising:
first and second water supplies at first and second relatively high and low temperatures, respectively, the first and second water supplies originating from a common source prior to assuming the first and second relatively high and low temperatures and the first water supply being disposed downstream from a component of a Heat Recovery Steam Generator (HRSG);
a heat exchanger, coupled to a supply of fuel and the water supplies, through which the fuel flows toward a combustor of a gas turbine engine and relative amounts of the water supplies flow for fuel heating,
the first water supply being output to the heat exchanger from the component of the HRSG disposed downstream from the common source, and
the second water supply being bypassed to the heat exchanger from the common source around the component of the HRSG and fed by an auxiliary water supply at a point between the common source and the heat exchanger; and
a controller, operably interposed between the water supplies and the heat exchanger, to select and/or modulate the relative amounts of the water supplies permitted to flow through the heat exchanger to heat the fuel to a temperature based on a heating requirement to meet a modified wobbe index (MWI) rating.

17. The system according to claim 16, wherein the component comprises at least an intermediate pressure (IP) economizer, and
wherein the first water supply at the first temperature is output from at least the IP economizer and the second water supply at the second temperature bypasses at least the IP economizer or is provided from the auxiliary water supply comprising an alternate water supply.

18. The system according to claim 16, further comprising a fuel testing device coupled to the controller and disposed at and or upstream of the heat exchanger to determine the composition of the fuel or a calorific heating value of the fuel and a specific gravity thereof, wherein the controller comprises memory on which fuel information is stored and determines the heating requirement based on a direct measurement of the heating value or by the determined fuel composition.

19. The system according to claim 16, further comprising a fuel temperature measuring device coupled to the controller and disposed at the heat exchanger to determine the temperature of the fuel.

20. The system according to claim 16, further including first and second piping to fluidly couple the first and second water supplies to the heat exchanger, respectively, wherein the controller comprises first and second isolation and/or flow control valves disposed upstream from the heat exchanger and along the first and second piping, respectively.

21. The system according to claim 16, further including first and second piping to fluidly couple the first and second water supplies to the heat exchanger, respectively, wherein the controller comprises a three-way flow control valve disposed upstream from the heat exchanger and at terminals of the first and second piping.

* * * * *